United States Patent [19]

Uchinami

[11] Patent Number: 5,345,919

[45] Date of Patent: Sep. 13, 1994

[54] FUEL INJECTION APPARATUS FOR AN INTERNAL COMBUSTION ENGINE

[75] Inventor: Masanobu Uchinami, Himeji, Japan

[73] Assignee: Mitsubishi Denki Kabushiki Kaisha, Tokyo, Japan

[21] Appl. No.: 103,234

[22] Filed: Aug. 6, 1993

[30] Foreign Application Priority Data

Aug. 11, 1992 [JP] Japan .................. 4-214261

[51] Int. Cl.⁵ ..................................... F02M 23/04
[52] U.S. Cl. ............................................. 123/533
[58] Field of Search ............... 123/531, 532, 533, 534

[56] References Cited

U.S. PATENT DOCUMENTS

| | | | |
|---|---|---|---|
| 2,710,600 | 6/1955 | Nallinger | 123/533 |
| 4,690,118 | 9/1987 | Hofbauer et al. | 123/533 |
| 5,024,201 | 6/1991 | Kobayashi et al. | 123/531 |
| 5,156,133 | 10/1992 | Sugimoto et al. | 123/531 |
| 5,190,216 | 3/1993 | Deneke | 123/533 X |
| 5,205,120 | 4/1993 | Oblander et al. | 123/531 X |
| 5,207,204 | 5/1993 | Kawachi et al. | 123/533 |
| 5,218,943 | 6/1993 | Takeda et al. | 123/531 |

*Primary Examiner*—Willis R. Wolfe
*Attorney, Agent, or Firm*—Sughrue, Mion, Zinn, Macpeak and Seas

[57] ABSTRACT

A fuel injection apparatus has an injector 4 for supplying fuel to an internal combustion engine 1, an air passage 35 having one end connected to the injector for atomizing the fuel injected therefrom and the other end connected to an air source, an air control valve 30 disposed in the air passage for controlling the quantity of air flowing therethrough, and a control unit 37 connected to the air control valve for controlling it in accordance with operating conditions of the engine. A pressure pump 40 may also be connected in the air passage for pressurizing the air therein, together with a pressure adjuster 42 disposed in a by-pass pipe 44 for controlling the pressure within the air passage, and a check valve 46 for preventing any pressurized air back flow.

4 Claims, 3 Drawing Sheets

FUEL INJECTION APPARATUS FOR AN INTERNAL COMBUSTION ENGINE

BACKGROUND OF THE INVENTION

This invention relates to a fuel injection apparatus for an internal combustion engine and, more particularly, to a fuel injection apparatus in which fuel is atomized by air supplied through an air passage.

FIG. 6 is a schematic diagram illustrating one example of a fuel injection system of a known fuel injection apparatus for an internal combustion engine, in which an internal combustion engine 1 has an intake pipe 20 for supplying air to the internal combustion engine 1. The intake pipe 20 has an air flow throttle valve 2 disposed therein for controlling the air which flows through the intake pipe 20. The air flow throttle valve 2 divides the intake pipe 20 into a higher-pressure portion 20a and a lower-pressure portion 20b which have different air pressures. The intake pipe 20 comprises an intake manifold 20c disposed between the air flow throttle valve 2 and a cylinder 1a of the internal combustion engine 1 in the lower-pressure portion 20b of the intake pipe 20. An air flow sensor 3 is disposed in the intake pipe 20 for detecting a quantity of the air which flows through the intake pipe 20. The air flow sensor 3 is electrically connected to an electronic control unit 6 (ECU) for supplying an output signal indicative of the air flow amount to the ECU 6.

A fuel injector 4 is disposed in the intake manifold 20c and has a nozzle which faces the cylinders 1a of the internal combustion engine 1 for jetting fuel supplied from a fuel tank (not shown) by a fuel pump (not shown) to provide an air-fuel mixture the cylinders 1a of the internal combustion engine 1. The fuel injector 4 is electrically connected to the ECU 6 and operates according to pulse signals provided by the ECU 6. As seen from FIG. 6, the fuel injection apparatus also comprises an air passage pipe 5 whose one end is connected to the higher-pressure portion 20a of the intake pipe 20 between the air flow sensor 3 and the air flow throttle valve 2 and whose the other end is connected to the lower-pressure portion 20b close to the nozzle of the fuel injector 4 for impinging air at a high speed to fuel injected from the fuel injector 4 to promote an atomization of the fuel spray. Disposed at the top of the cylinder 1a are, respectively, an intake valve 7a and an exhaust valve 7b, and a piston 8 is disposed within each of the cylinders 1a.

In the known fuel injection apparatus as described above, the fuel injector 4 is supplied with fuel whose pressure is electrically controlled at a predetermined value by a pressure regulator (not shown). The ECU 6 determines a controlling duty ratio according to the output signals from the air flow sensor 3 and output signals from a cooling water temperature sensor (not shown) which may be disposed in the water jacket (not shown). Then the ECU 6 supplies pulse signals indicating the controlling duty ratio to the fuel injector 4. The fuel injector 4 opens or closes electromagnetically according to the pulse signals from the ECU 6 and jets the fuel into the cylinders 1a of the internal combustion engine 1. The quantity of the fuel jetted by the fuel injector 4 is controlled to be in proportion to the controlling duty ratio indicated by the pulse signals from the ECU 6. Therefore, fuel of the most suitable quantity can be always supplied by the fuel injector 4 according to the operating condition of the internal combustion engine 1.

Further, due to the difference of air pressure between the higher-pressure portion 20a and the lower-pressure portion 20b of the intake pipe 20 which are separated by the air flow throttle valve 2, air of a relatively high pressure is supplied at a high speed to the nozzle of the fuel injector 4 through the air passage pipe 5 and it impinges against the fuel injected from the fuel injector 4 to promote atomization of the fuel.

However, the quantity of the high-speed air flowing through the air passage pipe 5 is determined on the basis of only the difference in air pressure between the high-pressure portion 20a and the lower-pressure portion 20b of the intake pipe 20. Further, the quantity of the high-speed air is selected to be comparatively small because the engine speed of the internal combustion engine 1 cannot be made high during idling conditions because the fuel consumption becomes worse and is not economical when the idling engine speed is high. Hence, in spite of the promotion of the atomization of the fuel as described above, the quantity of the high-speed air supplied to the fuel injector for fuel atomization is not enough for the optimum atomization in all conditions except for the-idling of the internal combustion engine 1, and the particle diameter of the fuel cannot be small enough to provide a suitable combustion.

Further, the amount of fuel injection varies in accordance with the operation state of the internal combustion engine 1, such as the suction air flow rate and the coolant temperature as described above, and there is an optimum air flow rate through the air passage pipe which most suitably atomizes the fuel in accordance with the fuel injection amount. However, this optimum air flow rate cannot be realized with the known fuel injection apparatus. Therefore, the fuel consumption cannot be efficient and a lot of Hydro Carbon (HC) has been emitted undesirably.

SUMMARY OF THE INVENTION

Accordingly, one object of the present invention is to provide a fuel injection apparatus for an internal combustion engine free from the above-discussed problems of the known fuel injection apparatus.

Another object of the present invention is to provide a fuel injection apparatus which provides improved combustion in the internal combustion engine.

Still another object of the present invention is to provide a fuel injection apparatus having a good fuel consumption.

Another object of the present invention is to provide a fuel injection apparatus which promotes a most suitable atomization of the fuel.

A further object of the present invention is to provide a fuel injection apparatus emitting only a small amount of Hydro Carbon (HC).

With the above objects in view, the fuel injection apparatus of the present invention comprises a fuel injector for supplying a fuel to an internal combustion engine, an air passage having one end connected to the fuel injector for atomizing the fuel injected from the fuel injector and the other end connected to an air source, an air control valve disposed in the air passage for controlling a quantity of air flowing therethrough, and a control unit connected to the air controlling valve for control the control valve in accordance with an operating condition of the internal combustion engine.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 1:
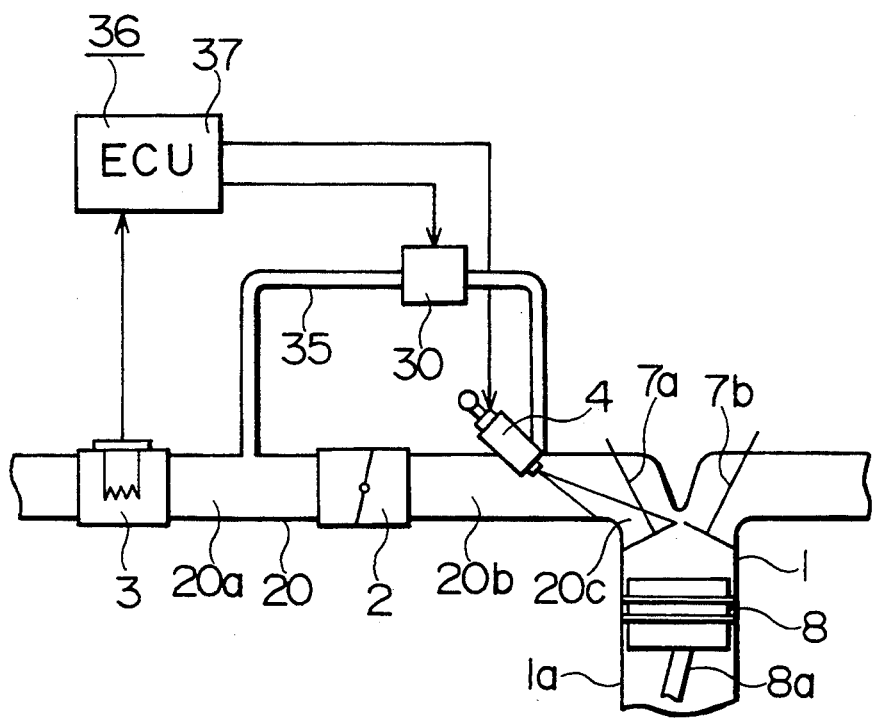
FIG. 1 is a schematic diagram of a fuel injection system of an embodiment of the fuel injection apparatus of the present invention.

FIG. 1 illustrates a fuel injection system employing a fuel injection apparatus of the present invention. In FIG. 1, an air intake pipe 20 is connected to an internal combustion engine 1 for supplying air to the internal combustion engine 1. The intake pipe 20 has an air flow throttle valve 2 disposed therein for controlling the air which flows through the intake pipe 20. The air flow throttle valve 2 divides the intake pipe 20 into the higher-pressure portion 20a and the lower-pressure portion 20b. The intake pipe 20 comprises an intake manifold 20c disposed between the air flow throttle valve 2 and the internal combustion engine 1 in the lower-pressure portion 20b of the intake pipe 20. The intake manifold 20c forks into a plurality of branch pipes each connected to a respective cylinder 1a of the internal combustion engine 1. An air flow sensor 3 is disposed in the intake pipe 20 for detecting the quantity of air which flows through the intake pipe 20. The air flow sensor 3 is electrically connected to an electronic control unit 36 (ECU) for supplying an output signal indicative of the air flow amount to the ECU 36. The fuel injection apparatus of the present invention comprises a fuel injector 4 disposed to the intake manifold 20c of the intake pipe 20 and whose nozzle faces the cylinders 1a of the internal combustion engine 1 for jetting fuel supplied from a fuel tank (not shown) by a fuel pump (not shown) to provide an air-fuel mixture in the cylinders 1a of the internal combustion engine 1. The fuel injector 4 is electrically connected to the ECU 36 and operates according to pulse signals provided by the ECU 36.

As seen from FIG. 1, the fuel injection apparatus comprises an air passage 35. One end of the air passage 35 is connected to the higher-pressure portion 20a of the intake pipe 20 between the air flow sensor 3 and the air flow throttle valve 2 and the other end of the air passage 35 is connected to the fuel injector 4 for striking air at a high speed to fuel sprayed from the fuel injector 4 to promote an atomization of the fuel.

According to the present invention, an air control valve 30 is disposed in the air passage 35 for controlling a quantity of the high-speed air supplied to the fuel injector 4 through the air passage 35 for atomizing the fuel. The air control valve 30 is electrically connected to an air control unit 37 which has a CPU and which is mounted in the ECU 36 for controlling the air control valve 30.

Figure 2:
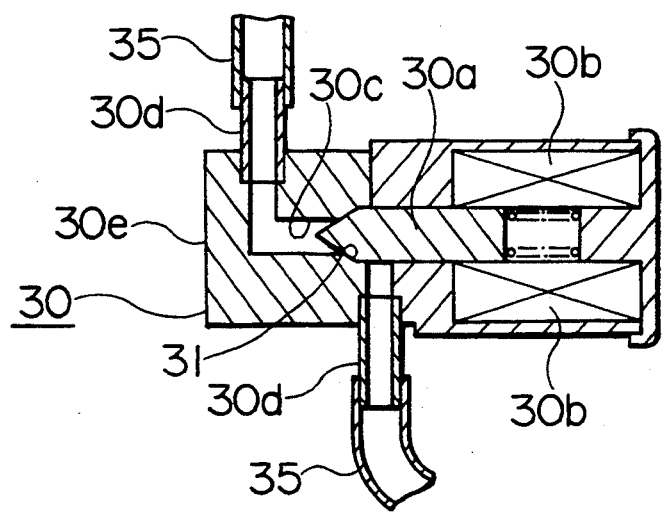
FIG. 2 is a sectional view of an air controlling valve of the present invention illustrated in FIG. 1.

FIG. 2 is a sectional view of an embodiment of the air control valve 30 of the present invention. As illustrated in FIG. 2, the air control valve 30 comprises a casing 30e, a valve member 30a movably disposed therein for allowing the controlled passage of the high-speed air, and an electromagnetic solenoid coil 30b disposed therein for actuating the valve member 30a. The casing 30e of the air control valve 30 has formed therein a cranked cavity or conduit 30c. The cranked conduit 30c is hermetically connected at both ends to the air passage 35 through joints 30d. The valve member 30a moves forward and backward into and out of and engagement with the valve seat 31 to control the air flow rate therethrough according to the energization of the solenoid coil 30b. As for the solenoid coil 30b, an on-off type coil or a proportional type coil, which are duty-controlled by the controlling duty ratio, may be used.

In FIG. 1, disposed at the top of the cylinder 1a are, respectively, an intake valve 7a and an exhaust valve 7b, and a piston 8 is disposed within each of the cylinders 1a.

The fuel injector 4 opens or closes electromagnetically according to the pulse signals from the ECU 36 and injects fuel into the cylinders 1a of the internal combustion engine 1. The ECU 36 determines the quantity of fuel according to the output signals from the air flow sensor 3 and a coolant temperature sensor (not shown) disposed in the water jacket (not shown) and pulse signals indicative of the engine speed provided by a crankshaft angle sensor (not shown), so that fuel of the most suitable quantity can always be supplied by the fuel injector 4 in accordance with the operating conditions of the internal combustion engine 1.

Further, the air control unit 37 of the ECU 36 calculates a load L on the internal combustion engine 1 which is approximated by:

$$L \approx Q/N,$$

from the quantity of the air Q and the engine speed N, and then concludes an intake-manifold pressure Pi within the intake manifold 20c which is defined by:

$$Pi = L\, Pa,$$

where Pa is the atmospheric pressure. Considering the difference of air pressure between the higher-pressure portion 20a and the lower-pressure portion 20b divided by the air flow throttle valve 2, the air control unit 37 determines the controlling duty ratio so that the most suitable quantity of high-speed air is supplied to the fuel spray from the fuel injector 4 according to the quantity of the fuel supplied to the fuel injector 4.

Figure 3:
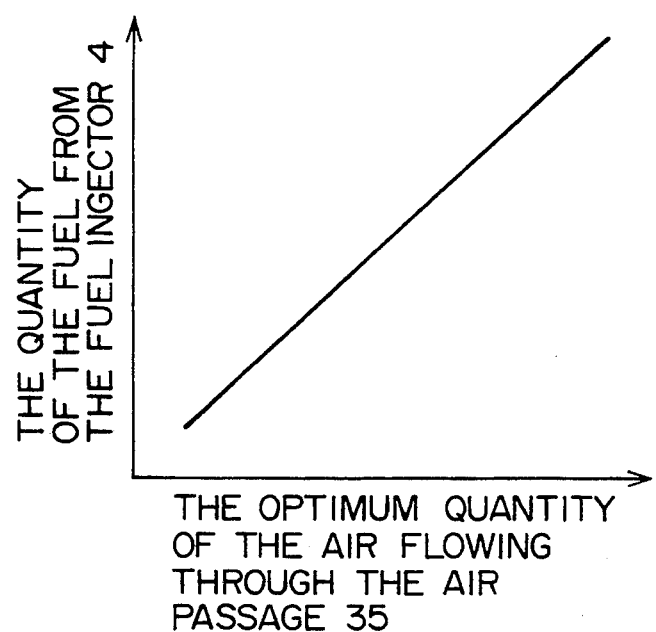
FIG. 3 is a graph showing a relation between the quantity of the fuel and the optimum quantity of the air flowing through the air passage illustrated in FIG. 1.
Figure 4:
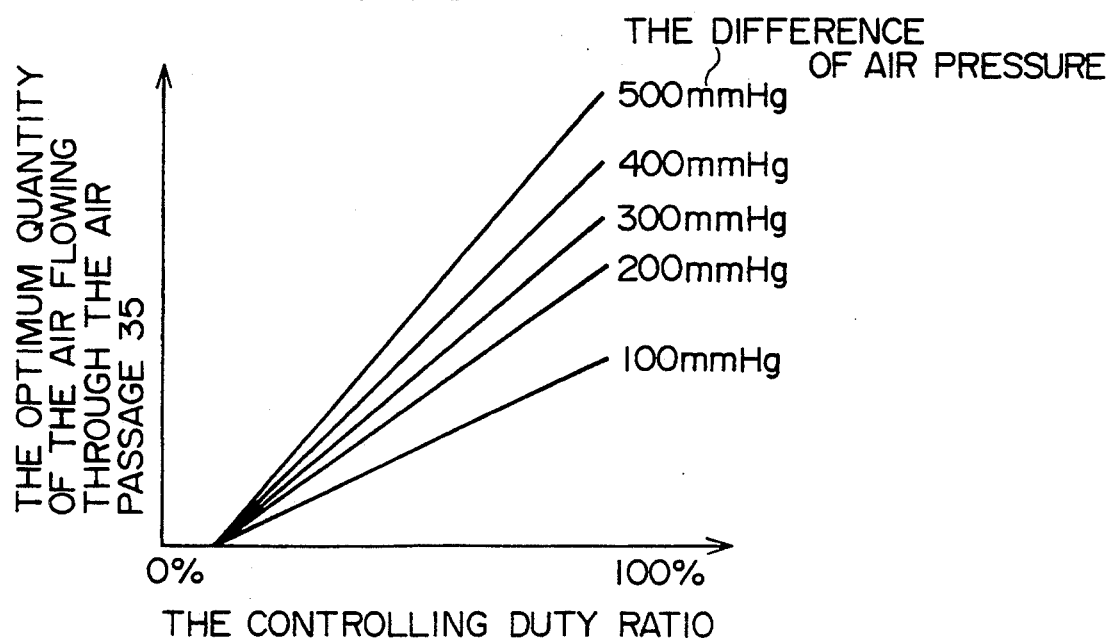
FIG. 4 is a graph showing a relation between the controlling duty ratio and the most suitable quantity of the air flowing through the air passage.

FIG. 3 shows a relation between the quantity of the fuel from the fuel injector 4 and the most suitable quantity of the air which flows through the air passage 35, and FIG. 4 shows a relation between the most suitable quantity of the air which flows through the air passage 35 and the controlling duty ratio dependent on the difference of air pressure across the air flow throttle valve 2. Firstly, as previously described, the most suitable quantity of the air which flows through the air passage 35 is determined from the quantity of the fuel from the injector 4 by the relation therebetween as shown in FIG. 3. Next, according the difference of air pressure across the air flow throttle valve 2, the controlling duty ratio is determined from the most suitable quantity of the air which flows through the air passage 35 by the relation therebetween as shown in FIG. 4. During the above operations, a suitable map or a table may, if necessary, be used in the CPU of the ECU 36 as is well-known in the art. Therefore, the air controlling valve 30 passes therethrough high-speed air of the most suitable quantity by pulse signals indicative of the controlling duty ratio supplied by the air control unit 37 according to the quantity of the fuel spray from the fuel injector 4.

In the embodiment of the fuel injection apparatus of the present invention, as described above, since the air control valve 30 electrically connected to the air control unit 37 is disposed in the air passage 35 and is controlled by the air control unit 37 so that high-speed air of the most suitable quantity can be jetted through the air passage 35 to the fuel spray from the fuel injector 4 according to the quantity of the fuel spray, a most suitable atomization of the fuel can always be promoted in all conditions of the internal combustion engine 1 and good combustion is carried out. Therefore, the fuel consumption can be efficient and only a limited amount of Hydro Carbon (HC) is emitted.

Figure 5:
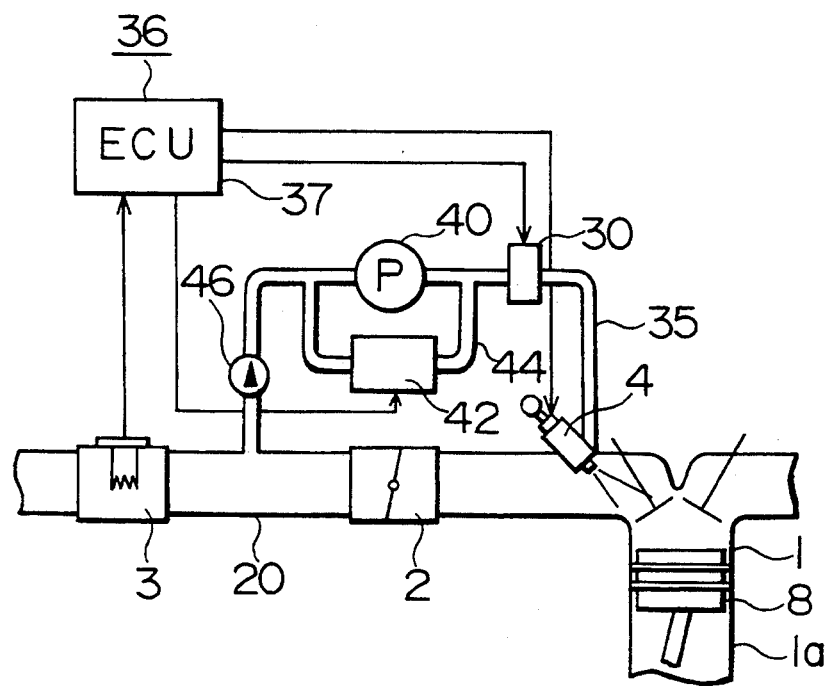
FIG. 5 is a schematic block diagram of the fuel injection system of another embodiment of the fuel injection apparatus of the present invention.
Figure 6:
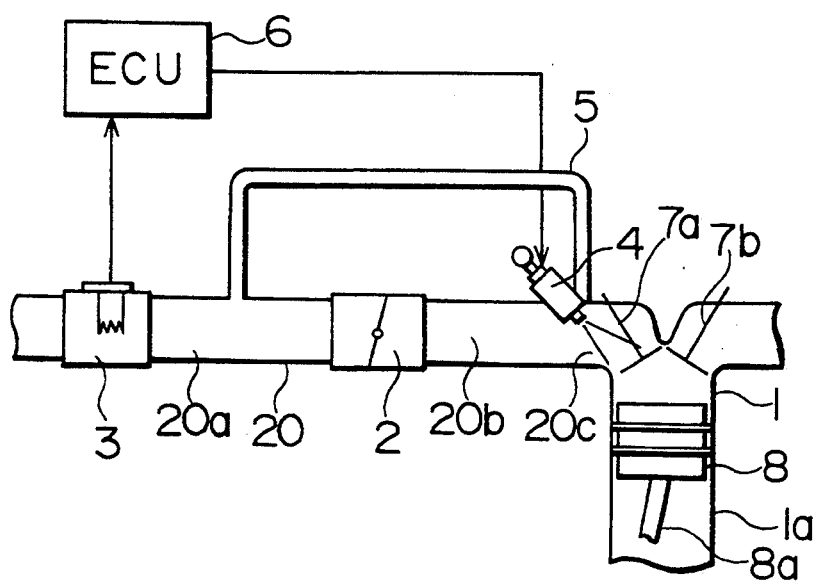
FIG. 6 is a schematic diagram of a fuel injection system of a known fuel injection apparatus.

FIG. 5 illustrates another embodiment of the fuel injection apparatus of the present invention, which has basically the same structure as that illustrated in FIG. 1 but is different in that a pressure pump 40 is disposed in the air passage 35 upstream of the air control valve 30 for pressurizing air in the air passage 35. A pressure adjusting means such as a pressure controller 42 is disposed in a by-pass pipe 44 of the air passage 35 for controlling the air pressure within the air passage 35. The by-pass pipe 44 is connected across the pressure pump 40. A check valve 46 is disposed in the air passage 35 upstream of the pressure pump 40 for preventing the pressurized air supplied by the pressure pump 40 from flowing backward. The pressure controller 42 is electrically connected to the ECU 36 and is operated by pulse signals supplied from the ECU 36 indicative of the operating conditions of the engine so that the pressurized air within the air passage 35 may be by-passed therethrough to control the air pressure. Otherwise, a pressure adjusting means which is electrically connected to the ECU 36 to be operated by pulse signals supplied from the ECU 36 may be disposed in the pressure pump 40 for controlling the air pressure within the air passage 35.

In this embodiment also, high-speed air of the most suitable quantity can be jetted through the air passage 35 to the fuel spray from the fuel injector 4 according to the quantity of the fuel spray. And further, the pressure pump 40 supplies the pressurized air forcibly under the control of the pressure controller 42 which is electrically connected to the ECU 36, and the check valve 46 prevents the pressurized air from flowing whereby the atomization of the fuel can be more precisely achieved in all conditions of the internal combustion engine 1 and good combustion is carried out. Therefore, the fuel consumption can be efficient and only a small minimum quantity of Hydro Carbon (HC) is emitted.

What is claimed is:

1. A fuel injection apparatus for an internal combustion engine comprising:
    a fuel injector for supplying a fuel to the internal combustion engine;
    an air passage having one end connected to said fuel injector for atomizing the fuel injected from said fuel injector and the other end connected to an air source;
    an air controlling valve disposed in said air passage for controlling a quantity of air flowing therethrough;
    a control unit connected to said air controlling valve for controlling said air controlling valve in accordance with an operating condition of the internal combustion engine;
    a pressure pump connected to said air passage for pressurizing the air within said air passage; and
    a check valve disposed on an up-stream side of said pressure pump of said air passage for preventing the pressurized air supplied by said pressure pump from flowing backward.

2. A fuel injection apparatus as claimed in claim 1, wherein said air controlling valve comprises a solenoid valve.

3. A fuel injection apparatus as claimed in claim 1, wherein said pressure pump comprises pressure adjusting means for controlling an air pressure within said air passage.

4. A fuel injection apparatus as claimed in claim 3, wherein said air passage has a by-pass pipe connected to said air passage across said pressure pump and said pressure adjusting means is disposed in said by-pass pipe.

* * * * *